(12) United States Patent
Foster et al.

(10) Patent No.: US 6,591,497 B2
(45) Date of Patent: Jul. 15, 2003

(54) METHOD OF MAKING CONVERTER HOUSING SIZE BASED UPON SUBSTRATE SIZE

(75) Inventors: Michael Ralph Foster, Columbiaville, MI (US); Stephen Joe Myers, Owosso, MI (US); Robert Anthony Lawrence, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/141,299

(22) Filed: Aug. 27, 1998

(65) Prior Publication Data

US 2002/0057998 A1 May 16, 2002

(51) Int. Cl.⁷ ................................................. B23P 15/00
(52) U.S. Cl. .................... 29/890; 29/407.01; 29/407.09; 73/432.1
(58) Field of Search ...................... 29/890, 428, 407.01, 29/407.05, 407.09; 422/179; 73/865.8, 432.1

(56) References Cited

U.S. PATENT DOCUMENTS

| 4,343,074 | A | * | 8/1982 | Bailey et al. | 29/890 |
| 4,400,860 | A | * | 8/1983 | Nonnenmann et al. | 29/890 |
| 4,750,251 | A | * | 6/1988 | Motley et al. | 29/890 |
| 4,765,047 | A | * | 8/1988 | Retallick | 29/890 |
| 4,782,661 | A | | 11/1988 | Motley et al. | 60/299 |
| 4,969,264 | A | | 11/1990 | Dryer et al. | 29/890 |
| 5,055,274 | A | * | 10/1991 | Abbott | 29/890 |
| 5,096,111 | A | | 3/1992 | Ishikawa et al. | |
| 5,118,476 | A | | 6/1992 | Dryer et al. | 422/179 |
| 5,150,506 | A | * | 9/1992 | Kotake et al. | 29/407 |
| 5,168,453 | A | * | 12/1992 | Nomaru et al. | 29/407 |
| 5,329,698 | A | | 7/1994 | Abbott | 29/890 |
| 5,330,728 | A | | 7/1994 | Foster | 422/177 |
| 5,449,500 | A | | 9/1995 | Zettel | 422/179 |
| 5,555,621 | A | * | 9/1996 | Tanabe et al. | 29/890 |
| 5,693,295 | A | | 12/1997 | Foster | 422/180 |
| 5,724,735 | A | * | 3/1998 | Ickes et al. | 29/890 |
| 5,729,902 | A | * | 3/1998 | Wieres et al. | 29/890 |
| 5,829,132 | A | * | 11/1998 | Sickels et al. | 29/890 |
| 5,836,076 | A | * | 11/1998 | Duta et al. | 29/407.05 |
| 5,909,916 | A | * | 6/1999 | Foster et al. | 29/890 |

FOREIGN PATENT DOCUMENTS

| EP | 0665365 | 8/1995 | |
| EP | 0681095 | 11/1995 | |
| EP | 0703354 | 3/1996 | |
| GB | 1455351 | 1/1974 | F01N/3/15 |
| GB | 2020190 | 11/1979 | |
| JP | 58032917 | 2/1983 | |

* cited by examiner

Primary Examiner—I Cuda Rosenbaum
(74) Attorney, Agent, or Firm—Vincent A. Cichosz

(57) ABSTRACT

A catalytic converter is constructed by measuring a substrate to be placed within the outer shell or can, wrapping the substrate in a selected mat and loading the package (mat and substrate) into the can. The can is larger than it will be at completion of manufacture to render such loading easier. Subsequent to loading, the measurement of the substrate is used to direct the degree to which the can is reduced in outside dimension such that a selected annulus is created between the substrate and can, said annulus being occupied by said mat.

9 Claims, 3 Drawing Sheets

METHOD OF MAKING CONVERTER HOUSING SIZE BASED UPON SUBSTRATE SIZE

TECHNICAL FIELD

The present invention relates to producing catalytic converters. More particularly, the invention relates to producing catalytic converters, the housing or canister of which is sized according to a specified annulus between the canister and the substrate based upon a measured size of the substrate to be mounted in the canister.

BACKGROUND OF THE INVENTION

Catalytic converters have been employed in vehicles for more than twenty years and have been manufactured in a number of ways.

One method of manufacturing catalytic converters is to provide a pre-made canister and stuff it with the catalyst substrate and the insulation/support pad. In this method the catalyst substrate is wrapped with an intumescent mat of a selected thickness and weight (various weights are employed for various applications and desired properties). Commonly, the wrapped substrate material will create an assembly having outer dimensions that measure about 8 mm larger than the inside dimensions of the converter shell or canister. The assembly as described is then forced through a reduction cone and into the converter shell. Up to 20,000 lbs of pressure can be required to accomplish the insertion of the assembly into the can. The method is costly.

A commonly preferred method for producing a catalytic converter is known as "the tourniquet method". The tourniquet method dispenses with the reducing cone and thus avoids the high insertion pressures on the substrate and mat materials. The method places the substrate and mat assembly into a canister open on one longitudinal edge. The canister is closed around the assembly by straps and compressed to the desired size. The open ends of the canister will, in this position, be overlapping and then are welded together. This method is also expensive and labor intensive. Further, due to this overlap, engineering design consideration must be given to the space alteration inside the canister due to the overlapped edge. The overlapped edge causes a mat density change in the local area of the overlap. This is a further cost addition.

In an effort to avoid the overlap and the need for welding the canister after insertion of the materials, it has been known to insert the assembly, as defined hereinabove, into an oversized metal tube and subsequently to size reduce the tube around the assembly. The tube is reduced to predetermined dimensions to produce a finished catalytic converter. An example of this technology is found in U.S. Pat. No. 5,329,698.

SUMMARY OF THE INVENTION

It is an object of the invention to increase control over the density of an intumescent mounting mat within a catalytic converter and to increase control over the amount of pressure placed on the catalytic substrate within the housing canister to provide a long life catalytic converter.

It is another object of the invention to reduce the difficulty of conventional manufacturing processes for the construction of catalytic converters.

Yet still another object of the invention is to reduce manufacturing time and cost.

Advantageously, the method for producing catalytic converters and the catalytic converter produced thereby, achieve the above objects by measuring a catalytic substrate prior to wrapping the same in an intumescent material mat, loading the wrapped catalytic substrate in an oversized canister and size reducing the canister to provide a preselected annulus relative to the measured substrate.

BRIEF DESCRIPTION OF THE DRAWINGS

The present invention will now be described, by way of example only, with reference to the accompanying drawings in which.

DETAILED DESCRIPTION OF THE INVENTION

The invention significantly improves the state of the art in several important ways. Firstly, the method is less time consuming and is well suited to complete automation; secondly, the method employs existing manufacturing tools, thus reducing startup cost; and lastly, the invention significantly reduces total costs incurred in producing a catalytic converter. This is particularly true in view of the newest emissions regulations that cause converter manufacturers to use less durable substrate materials (on the order of about 10% the strength of current converters). While the invention is particularly suitable and beneficial for use in connection with the newer catalyst substrates, the invention is, of course, equally suited to use with the older substrates.

The concept of the invention is the measurement of individual substrates (or a representative portion of a lot of substrates) prior to them being wrapped in an intumescent mat. Measurement of the substrate is beneficial because individual substrates vary significantly in size. The substrate is generally a ceramic material and the obligatory firing process causes the individual bricks to exhibit different sizes post-firing even though the green state substrates are provided in a generally uniform size. It is highly desirable that the bricks be properly packed, i.e., fitted or canned. By measuring the catalyst substrate and canning according to that measurement, a designed in pressure on the substrate and mat are achieved. A predetermined annulus, defined by the substrate outside dimensions and the "can" inside dimensions, is reliably produced by the method of the invention. By carefully creating the stated annulus during size reduction of the can, the density of the intumescent mat is ensured and the appropriate pressure on the substrate is obtained.

Figure 1:
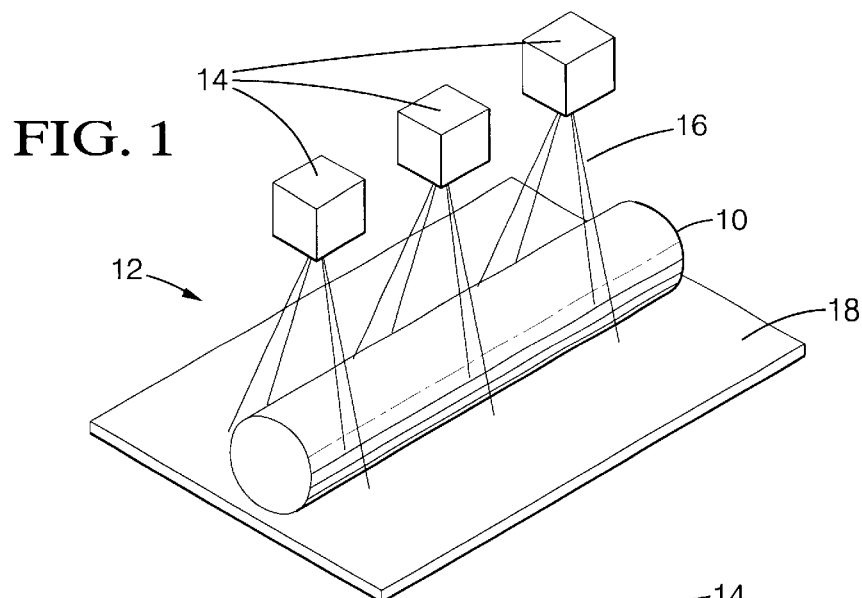
FIG. 1 is a perspective view of a catalyst substrate brick in a conventional measuring apparatus.
Figure 2:
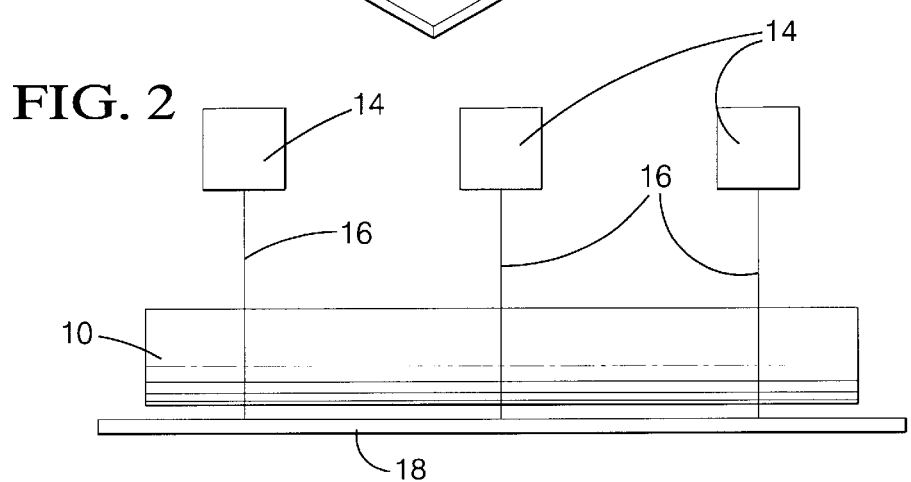
FIG. 2 is a side elevation view of FIG. 1 illustrating preferred positioning of measuring devices.

Referring to FIGS. 1 and 2, the substrate 10 is illustrated as it is being measured preferably by a laser measuring device 12 (such laser measuring devices being commonly known and commercially available from a variety of sources). The device 12 may be any measuring device capable of measuring the dimensions of a substrate 10. In accordance with a preferred embodiment, the laser measuring device 12 employs three lasers 14 positioned with one laser 14 central to the substrate and the two other lasers 14 about ½" from each end of the substrate, respectively. Each laser 14 produces a laser plane 16 that is projected onto (and past) the substrate 10. The light that is received at receptor 18 necessarily includes a gap that corresponds to one of the dimensions of the substrate 10. Since there are preferably three lasers 14, three measurements are received by receptor 18. In order to ensure that the measurements are an accurate reflection of the substrate dimension, and because firing is not exact with respect to shrinkage (the cylinder, for example, might not actually be round), the substrate 10 is preferably rotated along its own axis and several measurements are taken. An average of all of the measurements is sufficient to employ as a reference for the can reducing procedure discussed hereunder.

Subsequent to measuring the substrate 10, an intumescent mat 20 is wrapped around the substrate in one of a number of conventional mat wrapping procedures or new procedures. The wrapping procedure is not critical to functionality of the invention beyond the considerations that must be given to mat wrapping in current canning procedures such as density, uniformity, etc. More specifically, the mat is wrapped around the substrate to form an annular ring of material whose axis is the same as the substrate material. The mat material functions to both mount the substrate and insulate the can from the heat of the substrate. It is very important that the pressure placed on the mat and substrate are the proper amount to successfully hold the substrate, insulate it from shock and substantially fill the desired annulus.

Because the can 22 is of an oversized dimension initially, the mat wrapped substrate easily fits within can 22 and may be placed therein by hand. The "loading" of the can with the mat wrapped substrate is carried out axially since the can is in a perimetrically continuous tubular shape with no break therein (not a clam shell design which is beneficial because it avoids welding.) The density of the intumescent mat 20 desired is calculated in advance and an appropriate weight mat is employed. The mat may or may not occupy the entirety of the annulus defined by the substrate 10 and the inner dimensions of the un-reduced can 22. This is immaterial to the invention. Because of the control in size reducing the can 22, the mat 20 will occupy the annulus between the substrate and the reduced can once it has been reduced. The mat 20 will at this point exhibit the density it was designed to exhibit.

An optional aspect of the invention, to further ensure that mat 20 will assume the desired density in the size reduced can 22, is to weigh the mat that will be employed. The weighing of the mat would take place in a weighing device 26 which provides information either to a technician or a controller. By taking into account the weight of the mat 20 as well as the dimensions of substrate 10, mat density in the size reduced can 22 is virtually assured. Typically, mat weights up to 6200 g/m² are available commercially in single sheets. While these are generally accurate weights, it is possible for the weights of the mat to be errant. In this case weighing the mat is preferable to ensure proper mat density in the final product.

Figure 6:
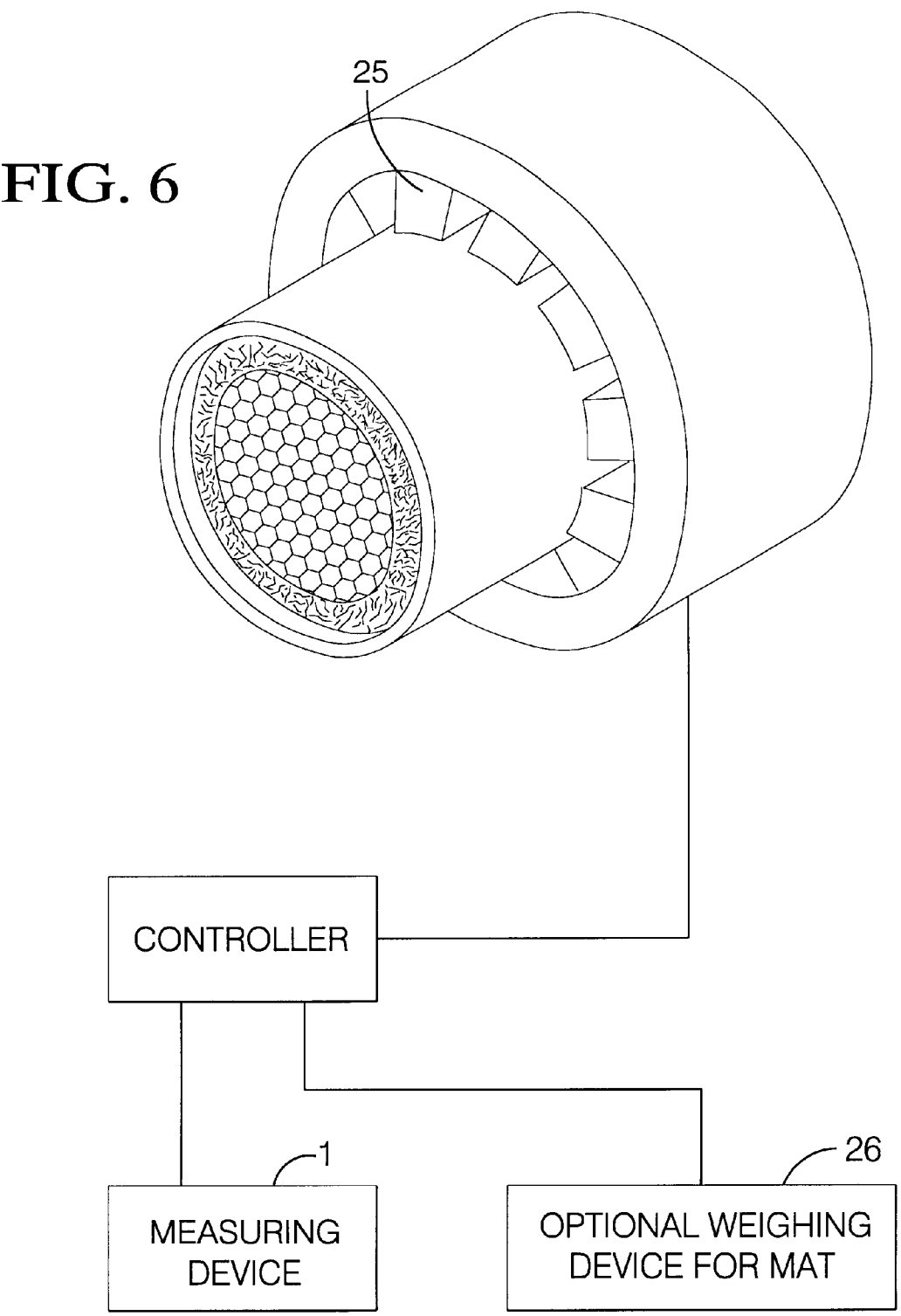
FIG. 6 is a schematic perspective illustration of the canister of the invention being size reduced.

Subsequent to loading the un-reduced can 22, the whole assembly (substrate, mat and canister) is placed in a conventionally available size reducing machine 24, commonly employed in the construction of catalytic converters. As shown in FIG. 6, a machine having 10–12 reducer fingers 25 is preferably employed to produce even reduction and uniform stress in can 22 and to thus create a uniform compressive load on the substrate and mat. Can 22 is reduced only far enough to result in a structure having inside dimensions that define an annulus of predetermined dimension relative to the actual measured (or average or representative, where applicable) outside dimensions of the substrate 10. This ensures the proper compressive load (i.e. density of mat 20 and pressure on substrate 10) to provide a converter of long life. A secondary benefit of the size reducing procedure is the thickening of the can metal due to the size reduction. This allows the use of thinner (less expensive) can metal as the starting material than the specified metal thickness of the end product because at the termination of the procedure, a thinner gauge metal will actually have become thicker so as to meet specifications. The precise change in thickness can be calculated by one of ordinary skill in the art to determine appropriate initial can material thickness.

Figure 3:
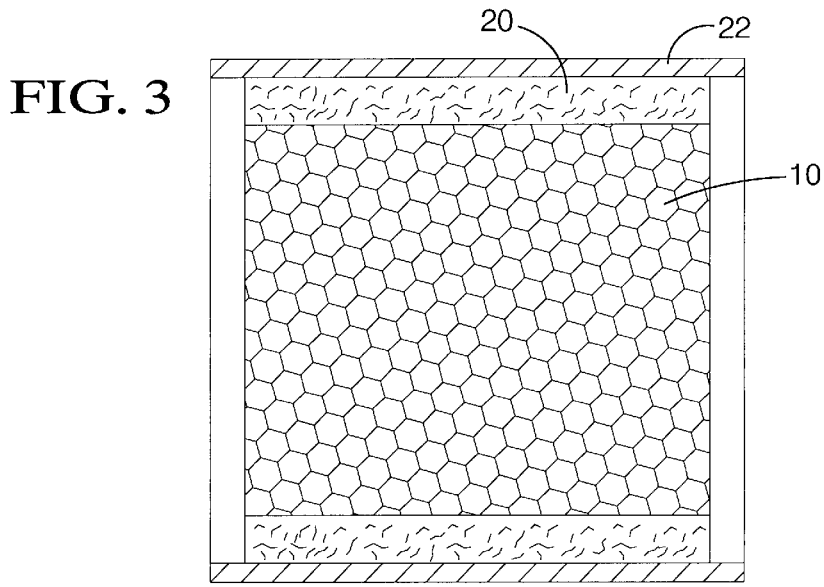
FIG. 3 is a schematic cross section view of a wrapped catalyst substrate within the oversized canister.
Figure 4:
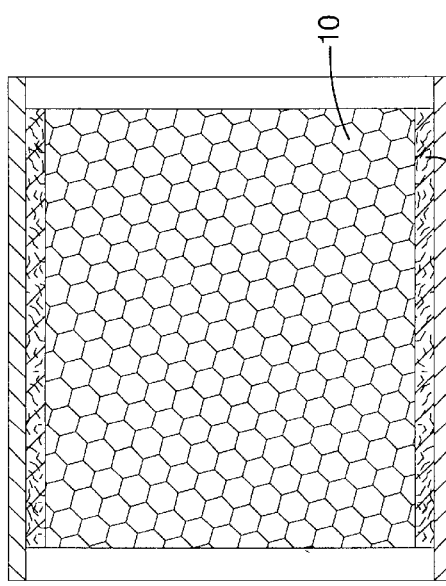
FIG. 4 is a schematic cross section view similar to FIG. 3 but where the canister has been sized around the catalyst substrate.

During the canning procedure the converter cross section changes from the view of FIG. 3 to the view of FIG. 4. The squeezed mat 20a will be apparent to one of skill in the art. As is also apparent from the illustration of FIG. 4, the reduction in can size is contained in a central area of can 22 and leaves small annular sections 30 at either end of the can 22. By so leaving these areas 30, common end cones 32 (not shown) are maintained. This, of course, avoids the need for specially formed end cones for each sized can 22.

Figure 5:
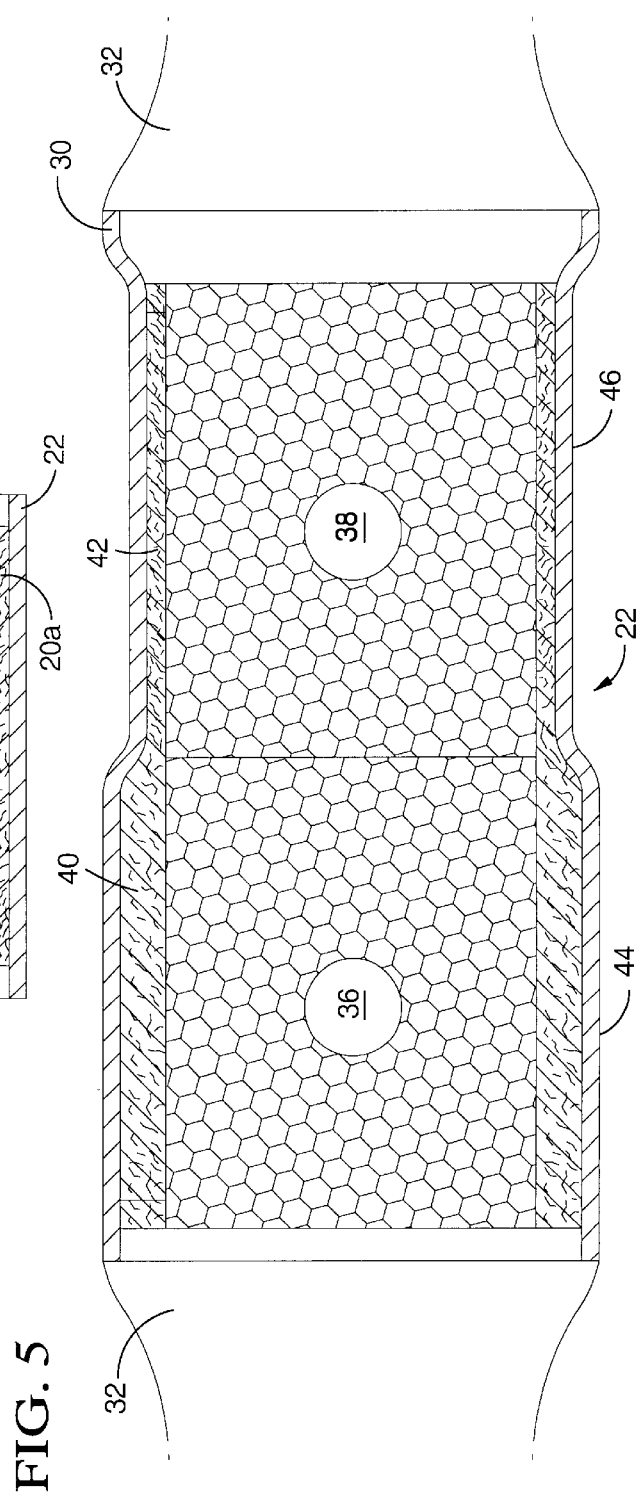
FIG. 5 is illustrated schematically, a two catalyst design with the canister sized to achieve a different mount density for each brick while maintaining common end cone assemblies.

Yet another important benefit of the invention is that it simplifies the construction of dual bed catalytic converters having different mat densities for each brick. As illustrated in FIG. 5, the catalyst bricks 36, 38 are the same size. The mat however is delineated centrally into two densities. The first is on the left side of the drawing and marked 40, the second is on the right and marked 42. The different density of the sections 40 and 42 is occasioned by the different size of the canister, i.e. section 44 and 46, respectively to sections 40 and 42. It will be appreciated that section 46 is size reduced further than section 44 to produce a smaller annulus between can 22 and substrate 38. Different densities of intumescent mat provide different properties as known to one of skill in the art.

As one of skill in the art will recognize, the procedure described herein may be carried out manually or in a fully automated operation. Where a fully automated system is desired and is employed, preferably a controller 28 is connected to the substrate measuring device 12 and the can reducing machine 24 as well as the weighing device 26 (optional). A schematic illustration of the system is provided in FIG. 6. Primarily the completed (i.e., fired and treated) substrate is measured with an appropriate measuring device, the device described above being but one example. Measurement is preferably carried out to the nearest two or three thousandth of an inch. The annulus desired between the can 22 and the substrate 10 is known because it is dictated by design specification as is the desired density of the mat 20. Following a weighing of mat 20 (if employed), the mat is wrapped around substrate 10 in a known manner to provide desired and specified mat characteristics (i.e. density, etc.) The assembly of the mat 20 and substrate 10 is then loaded into oversized can 22 and the assembly (10 and 20) and the can 22 are moved to can reducing machine 24 which as stated, is connected to controller 28. Controller 28 communicates the measurements of substrate 10 and the weight of mat 20 (if weighed) to can reducing machine 24. Controller 28 further provides specific information to machine 24 regarding, precisely, the degree to which can 22 must be reduced. Upon execution by machine 24 of its instructions, a catalytic converter having a can, sized particularly to a specific substrate, is produced and the product is ready for further processing as desired or installation on a vehicle.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A method for supporting a substrate in a catalytic converter, comprising:

determining a measured outside dimension of a catalyst supporting substrate;

enclosing said catalyst supporting substrate in an intumescent mat of an initial density to form a subassembly;

inserting said subassembly into an inner area of a canister having a first inner dimension; and reducing said first inner dimension of said inner area to create a second inner dimension, said second inner dimension increasing said initial density of said intumescent mat to a final density, said final density corresponding to a preferred retaining force on said catalyst supporting substrate, said second dimension being determined from said measured outside dimensions of said catalyst supporting substrate and said initial density of said intumenscent mat.

2. The method as in claim 1, wherein a wall thickness of a portion of said canister is increased due to the reducing said first inner dimension to said second inner dimension.

3. The method as in claim 1, further comprising: weighing said intumescent mat to determine said initial density.

4. The method as in claim 1, wherein determining said measured outside dimension of said catalyst supporting substrate comprises:

measuring at least a portion of a batch of substrates to determine a representative outside dimension of said batch, said catalyst supporting substrate being a member of said batch of substrates; and setting said measured outside dimension of said catalyst supporting substrate equal to said representative outside dimension.

5. The method as in claim 1, further comprising reducing only a portion of said canister to said first inner dimension, said portion being disposed about said subassembly.

6. The method as in claim 1, further comprising increasing a wall thickness of said canister only in said central area due to reducing said first inner dimension of said central aria to said second inner dimension.

7. A method for controlling the density of an intumescent mat in a catalytic converter, comprising:

measuring a substrate to determine measured outside dimensions thereof;

wrapping said substrate in an intumescent mat of a known density;

loading said substrate and said mat into a canister having a fist dimension and reducing said first dimension of said canister with said substrate and mat loaded therein to create a second dimension of said canister, said second dimension of said canister increasing the density of said intumescent mat to preferred density in order to provide a preferred retaining force on said substrate, said second dimension being determined by said measured outside dimensions of said substrate and said known density of said mat.

8. A method for producing a plurality of catalytic converters, comprising:

measuring each of a plurality of substrates to determine an external dimension of each of said substrates;

wrapping each of said substrates with one of a plurality of intumescent mats of a known density to form a plurality of wrapped substrates;

loading each one of said plurality of wrapped substrates into one of a plurality of perimetrically continuous canisters to form a plurality of stuffed canisters; and sizing a portion of each of said plurality of stuffed canisters to create a predetermined annulus between said canister and said substrate based on said external dimension of said substrate and said known density of said intumescent mats.

9. A method for producing a plurality catalytic converters as in claim 8, wherein said method further includes weighing each of said plurality of mats prior to wrapping said plurality of substrates to determine said known density, and sizing said plurality of stuffed canisters to said predetermined annulus based on said external dimension and said known density.

* * * * *